United States Patent
Lee et al.

(10) Patent No.: US 11,839,283 B2
(45) Date of Patent: Dec. 12, 2023

(54) PORTABLE HAIR PRINTER AND PRINTING METHOD USING SAME

(71) Applicant: PRINKER KOREA INC., Suwon-si (KR)

(72) Inventors: Jong In Lee, Seoul (KR); Kyu Suk Lee, Suwon-si (KR); Tae Sik Yun, Seoul (KR)

(73) Assignee: PRINKER KOREA INC., Suwon-si (KR)

( * ) Notice: Subject to any disclaimer, the term of this patent is extended or adjusted under 35 U.S.C. 154(b) by 726 days.

(21) Appl. No.: 16/978,357

(22) PCT Filed: Mar. 6, 2019

(86) PCT No.: PCT/KR2019/002584
§ 371 (c)(1),
(2) Date: Sep. 4, 2020

(87) PCT Pub. No.: WO2019/172638
PCT Pub. Date: Sep. 12, 2019

(65) Prior Publication Data
US 2020/0390216 A1    Dec. 17, 2020

(30) Foreign Application Priority Data
Mar. 7, 2018  (KR) .................. 10-2018-0027049

(51) Int. Cl.
*A45D 19/00*  (2006.01)
*B41J 11/00*  (2006.01)
(Continued)

(52) U.S. Cl.
CPC ......... *A45D 19/00* (2013.01); *A45D 19/0075* (2021.01); *B41J 3/36* (2013.01);
(Continued)

(58) Field of Classification Search
CPC .. A45D 19/00; A45D 19/0075; A45D 19/005; A45D 19/0066; A45D 19/012;
(Continued)

(56) References Cited

U.S. PATENT DOCUMENTS

2004/0078278 A1*  4/2004  Dauga .................. A45D 44/005
                                                         434/100
2011/0129283 A1    6/2011  Samain
(Continued)

FOREIGN PATENT DOCUMENTS

CN    1625220    6/2005
CN    1728956    2/2006
(Continued)

OTHER PUBLICATIONS

International Search Report—PCT/KR2019/002584 dated Jun. 17, 2019.
(Continued)

*Primary Examiner* — Bradley W Thies
(74) *Attorney, Agent, or Firm* — CANTOR COLBURN LLP (57) ABSTRACT

A portable hair printer includes a communication module, a printer module that performs a printing operation, a memory that stores a program for printing an image on a surface of a bundle of hairs, and a processor that executes the program, wherein the program is executed by the processor, receives an image to be dyed on the bundle of hairs from the user terminal through the communication module, and transmits the received image to the printer module to perform an image printing operation for the bundle of hairs, and the portable hair printer further comprises a housing having the communication module, the printer module, the memory, and the processor embedded therein, and the housing
(Continued)

includes an upper housing and a lower housing hinged to each other around a hinge, and a sensor module.

15 Claims, 6 Drawing Sheets

(51) Int. Cl.
  *B41J 3/36* (2006.01)
  *B41J 3/407* (2006.01)
(52) U.S. Cl.
  CPC .............. *B41J 3/407* (2013.01); *B41J 11/008* (2013.01); *B41J 11/0045* (2013.01); *B41J 11/0095* (2013.01); *A45D 19/005* (2021.01); *A45D 19/0066* (2021.01)
(58) Field of Classification Search
  CPC . B41J 3/36; B41J 3/407; B41J 11/0045; B41J 11/008; B41J 11/0095; B41J 29/023; H04M 1/72412; H04M 1/72403
  See application file for complete search history.

(56) References Cited

U.S. PATENT DOCUMENTS

| | | |
|---|---|---|
| 2011/0162673 A1 | 7/2011 | Samain et al. |
| 2016/0183664 A1 | 6/2016 | Grez |
| 2017/0018093 A1 | 1/2017 | Kang et al. |
| 2017/0056303 A1 | 3/2017 | Rabe et al. |

FOREIGN PATENT DOCUMENTS

| | | |
|---|---|---|
| CN | 106061316 | 10/2016 |
| CN | 206197316 | 5/2017 |
| CN | 107625268 | 1/2018 |
| EP | 3680849 | 7/2020 |
| FR | 2810761 | 12/2001 |
| JP | 2001195568 | 7/2001 |
| JP | 2003266734 | 9/2003 |
| JP | 2006503610 | 2/2006 |
| JP | 2012146182 | 8/2012 |
| JP | 2014233944 | 12/2014 |
| JP | 2017504403 | 2/2017 |
| KR | 20060036802 | 5/2006 |
| KR | 200419894 | 6/2006 |
| KR | 101254540 | 4/2013 |
| KR | 101456942 | 11/2014 |
| KR | 20170009261 | 1/2017 |
| KR | 20170101957 | 9/2017 |
| KR | 101783314 | 10/2017 |
| WO | 2010004526 | 1/2010 |

OTHER PUBLICATIONS

European Search Report—European Application No. 19764317.4 dated Oct. 27, 2021, citing US 2004/0078278, US 2011/0162673, US 2017/0056303, EP 2326204, US 2011/0129283, EP 3680849, and US 2016/0183664.

* cited by examiner

PORTABLE HAIR PRINTER AND PRINTING METHOD USING SAME

BACKGROUND OF THE INVENTION

1. Field of the Invention

The present disclosure relates to a portable hair printer and a hair printing method using the same.

2. Description of the Related Art

Generally, a hair dye is divided into a temporary hair dye and a permanent hair dye depending on properties. The temporary hair dye is attached to surfaces of hairs to physically dye. The temporary hair dye is mainly used to cover prematurely gray hairs or to color the hairs, and there are various formulations such as sticks, gels, sprays, and mousses, and various products, such as color sticks, color sprays, color gels, color mousses, and color mascara are released.

In particular, a hair dye and an oxidizing agent mixed together are used as the permanent hair dye to dye hairs, and the hair dye and the oxidizing agent are stored in separate containers, and certain amounts thereof are mixed together when dyeing hairs.

However, there is inconvenience in handling of storing and maintaining the hair dye and the oxidizing agent in their respective containers, and there is inconvenience of mixing the hair dye and the oxidizing agent in a certain proportion when dyeing hairs. In addition, the hair dye once mixed to be used is not reusable due to oxidation, and when applied to hairs, the hair dye is applied to the scalp thickly or to the skin, and thus, there is a problem that causes side effects such as skin allergies to people with weak skin.

In this regard, Korean Patent Registration No. 10-1254540 (title of the disclosure: HAIR DYEING MACHINE) discloses a hair dyeing machine which a hair dye and an oxidizing agent are each squeezed into a dye supply portion, and a hair dye and an oxidizing agent can be mixed and ejected through a dye comb when dyeing hair.

In this way, hair dye manufacturing companies launch new products that are convenient to use and reduce dyeing time but does not launch products with a significant improvement.

SUMMARY OF THE INVENTION

The present invention is to solve the problems described above of the related art, and the present disclosure provides a portable hair printer that may dye hairs with an image of a design desired by a user, and a hair printing method using the same.

As technical means for solving the technical problem described above, a portable hair printer according to an embodiment of the present disclosure includes a communication module, a printer module that performs a printing operation, a memory that stores a program for printing an image on a surface of a bundle of hairs, and a processor that executes the program, wherein the program is executed by the processor, receives an image to be dyed on the bundle of hairs from the user terminal through the communication module, and transmits the received image to the printer module to perform an image printing operation for the bundle of hairs, and the portable hair printer further includes a housing having the communication module, the printer module, the memory, and the processor embedded therein, and the housing includes an upper housing and a lower housing hinged to each other around a hinge, and a sensor module and a printer head of the printer module is exposed at one end of the upper housing, and the sensor module is disposed at a position adjacent to the printer head of the upper housing and measures information on a movement speed of the portable hair printer on the bundle of hairs or a movement distance from a printing start point of the image, and the bundle of hairs is gripped between the upper housing and the lower housing as the upper housing and the lower housing approach each other.

According to another embodiment of the present invention, a hair printing method according to another embodiment of the present disclosure includes receiving an image to be dyed on a bundle of hairs from a user terminal through a communication module by using the portable hair printer, and transmitting the received image to a printer module included in the portable hair printer to perform an image printing operation for the bundle of hairs, wherein, the method further includes calculating a length of the bundle of hairs based on a value measured by a sensor module for detecting a movement state of the portable hair printer as the portable hair printer moves along the bundle of hairs while the bundle of hairs is gripped between the upper housing and the lower housing of the portable hair printer, before the receiving of the image is performed, and the received image is converted in size by the user terminal to correspond to the length of the bundle of hairs, based on the length of the bundle of hairs.

According to the problem solving means of the present invention described above, a portable hair printer may quickly and easily dye various images for expressing personality of a user on hairs of the user.

In addition, the portable hair printer performs an image printing operation as the portable hair printer moves along hairs while the hairs are gripped by the portable hair printer, and thus, it is possible to dramatically reduce time for dyeing a sophisticated image.

DETAILED DESCRIPTION OF THE EMBODIMENT

Hereinafter, embodiments of the present disclosure will be described in detail with reference to the accompanying drawings such that those skilled in the art to which the present disclosure belongs may easily implement. However, the present disclosure may be implemented in many different forms and is not limited to the embodiments described herein. In addition, in order to clearly describe the present disclosure in the drawings, parts irrelevant to the description are omitted, and like reference numerals are assigned to like parts throughout the specification.

Throughout the specification, when it is described that a part is "connected" to the other part, this includes not only a case in which the part is "directly connected" to the other part, but also a case in which the part is "electrically connected" to the other part through another element. In addition, when it is described that a part "includes" a configuration element, this means that the configuration element may further include other components, not to exclude other components, unless otherwise stated, and it should be understood that existence or addition possibilities of one or more other features, numbers, steps, operations, configuration elements, components, or combinations thereof are not excluded in advance.

Figure 1:
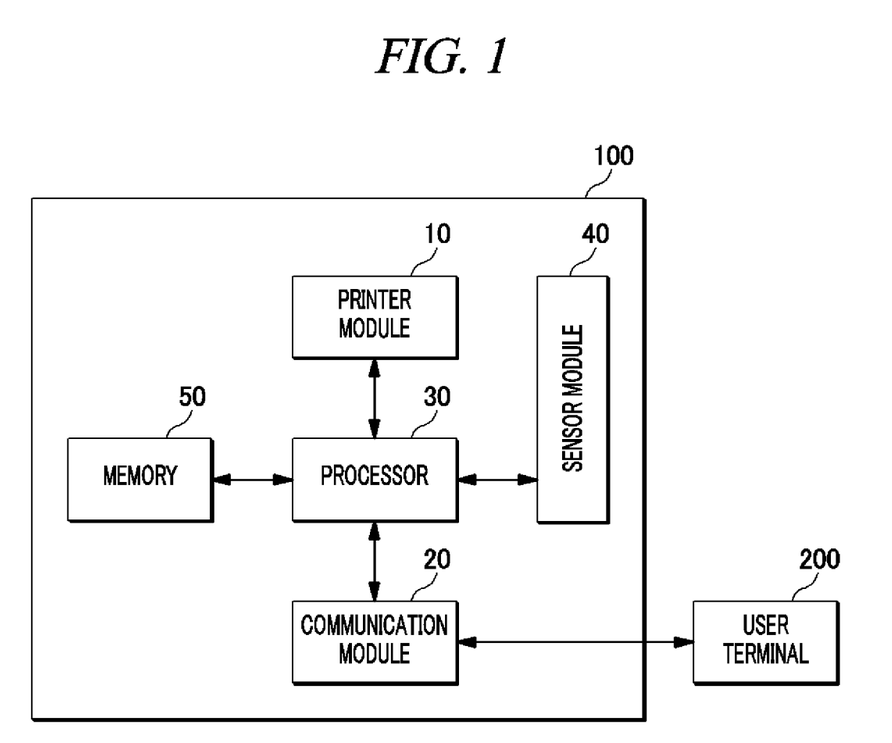
FIG. 1 is a block diagram illustrating a schematic configuration of a portable hair printer according to an embodiment of the present disclosure.

FIG. 1 is a block diagram illustrating a schematic configuration of a portable hair printer according to an embodiment of the present disclosure.

Referring to FIG. 1, a portable hair printer 100 according to an embodiment of the present disclosure includes a communication module 20, a printer module 10 that performs a printing operation, a memory 50 in which a program for printing an image on a surface of a hair is stored, and a processor 30 that executes the program. The program may be executed by the processor 30, receive an image to be dyed on the hair from a user terminal 200 through the communication module 20, and transmit the received image to the printer module 10, thus, an image printing operation for the hair may be performed.

Meanwhile, the memory 50 includes a non-volatile storage device that keeps stored information even when power is not supplied and a volatile storage device that requires power to keep the stored information.

In addition, the present disclosure further includes a sensor module 40 for detecting a movement state on the hair of the hair printer 100, and a program may adjust an output state of an image in synchronization with information on the movement state on the hair of the hair printer 100. Specifically, the sensor module 40 may measure information on a movement speed on the hair or a movement distance from an image printing start point. For example, the sensor module 40 may be configured by an optical sensor or a rotation roller disposed at a position adjacent to a printer head of an upper housing of the hair printer 100, and detailed description thereof will be made below.

Figure 2:
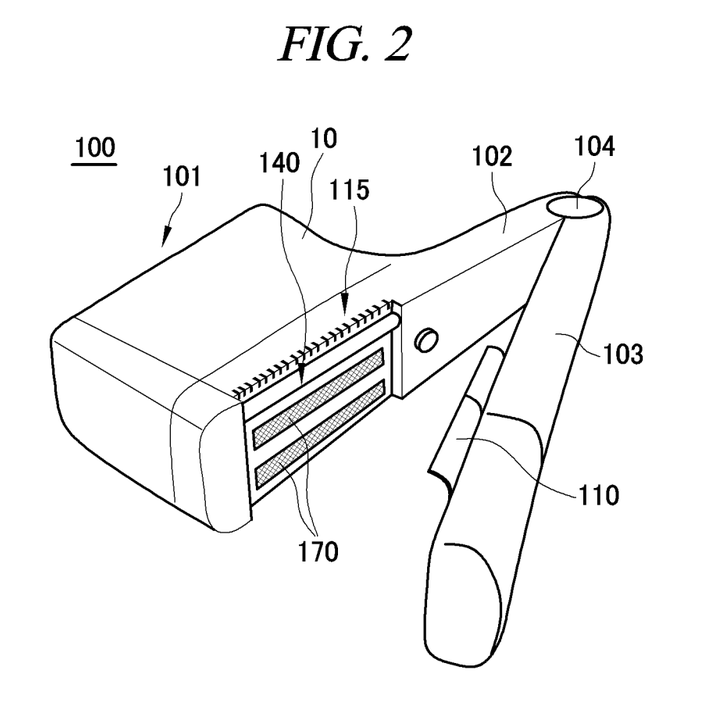
FIG. 2 is a perspective view illustrating an upper housing of the portable hair printer according to the embodiment of the present disclosure.

FIG. 2 is a perspective view illustrating the upper housing of the portable hair printer according to the embodiment of the present disclosure.

Figure 3:
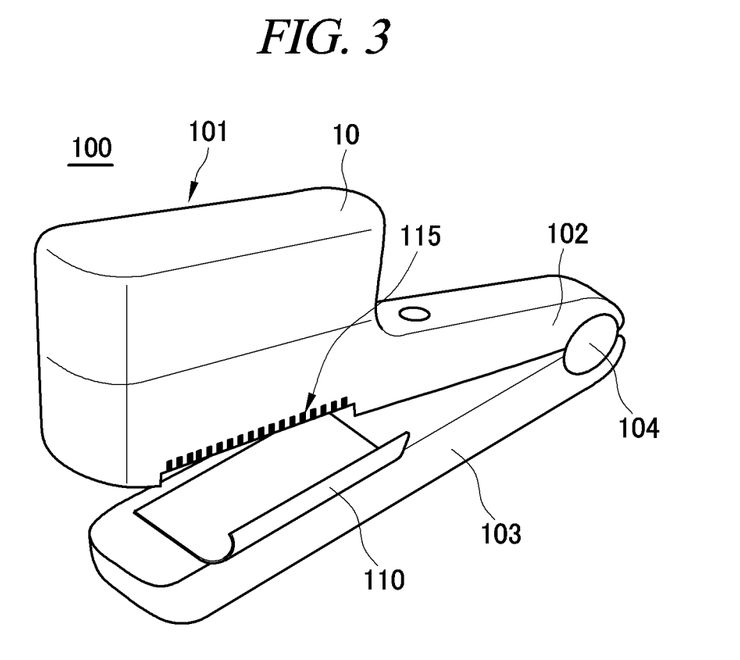
FIG. 3 is a perspective view illustrating a lower housing of the portable hair printer according to the embodiment of the present disclosure.

FIG. 3 is a perspective view illustrating a lower housing of the portable hair printer according to the embodiment of the present disclosure.

Figure 4:
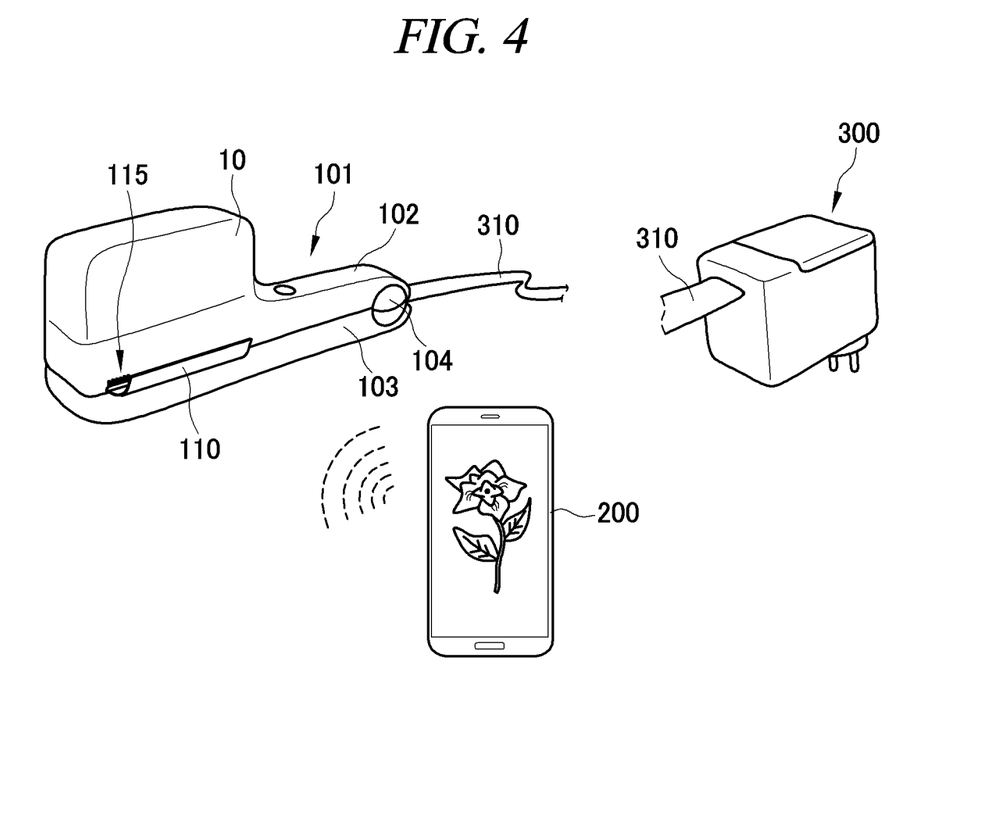
FIG. 4 is a view illustrating a configuration of the portable hair printer according to the embodiment of the present disclosure.

FIG. 4 is a view illustrating a configuration of the portable hair printer according to the embodiment of the present disclosure.

Figure 5:
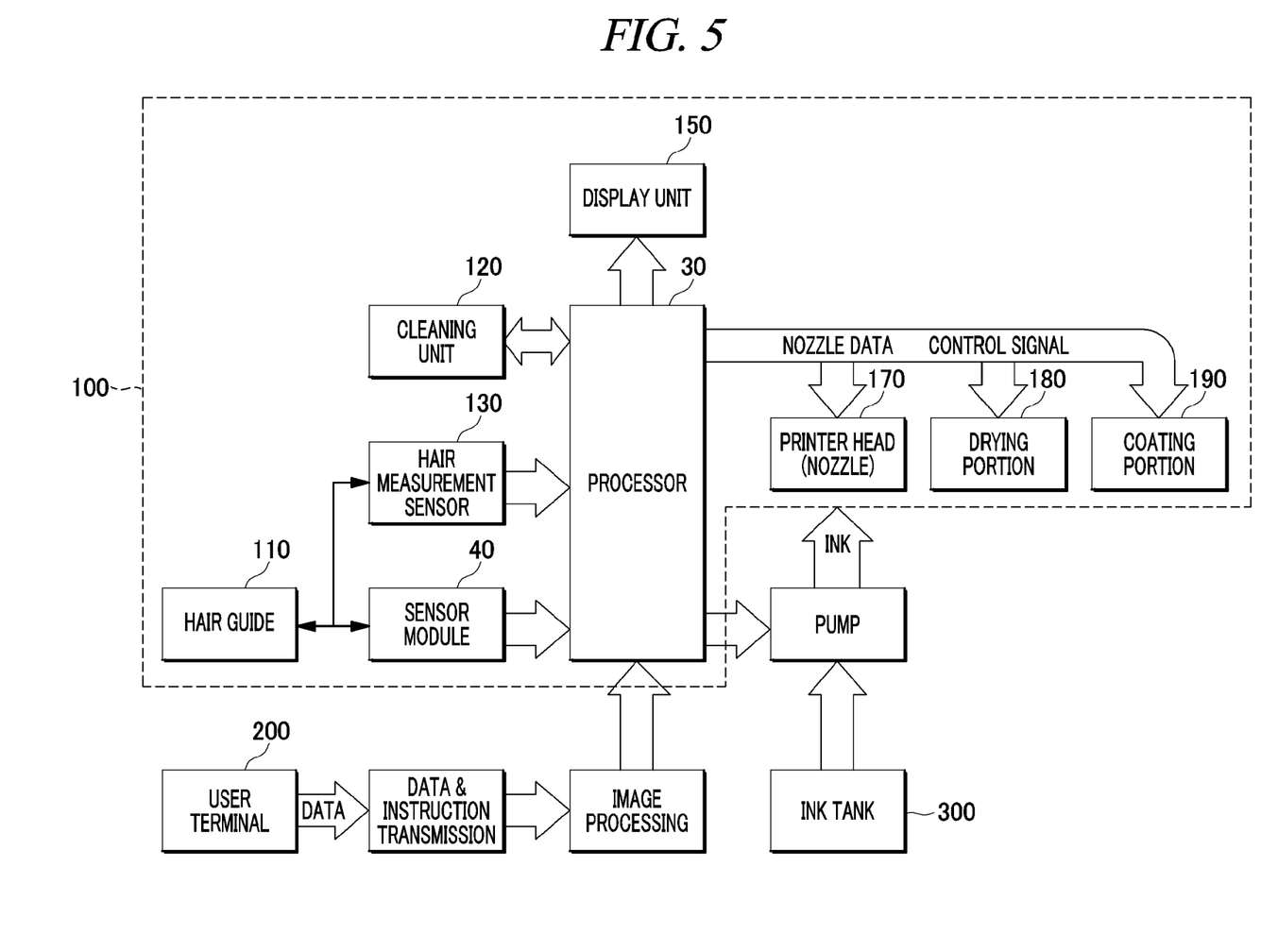
FIG. 5 is a diagram illustrating a detailed configuration of the portable hair printer according to the embodiment of the present disclosure.

FIG. 5 is a diagram illustrating a detailed configuration of the portable hair printer according to the embodiment of the present disclosure.

Specifically, the portable hair printer 100 according to the present disclosure further includes a housing 101 that houses the communication module 20, the printer module 10, the memory 50, and the processor 30. Here, the communication module 20 includes both wireless communication and wired communication.

Referring to FIG. 2, the housing 101 includes an upper housing 102 and a lower housing 103 hinged to each other around a hinge 104, and the printer head 170 of the printer module 10 is exposed at one end of the upper housing 102, and as the upper housing 102 and the lower housing 103 approach each other, hairs may be gripped between the upper housing 102 and the lower housing 103.

Here, the printer head 170 ejects dyeing ink so as to correspond to a type and the amount of ejection of the dyeing ink determined according to print data. For example, the dyeing ink may be composed of four types of C, M, Y, and W.

The printer module 10 may be configured in a form in which a replaceable ink cartridge of a general printer is embedded in the upper housing 102.

Referring to FIGS. 2 and 5, the housing 101 of the portable hair printer 100 according to the present disclosure further includes a rotation roller 140, a hair guide 110, a comb member 115, and a display unit 150 for displaying an operation state of the hair printer 100, and the sensor module 40 and a hair measurement sensor 130 may be embedded therein.

That is, the sensor module 40 may detect a rotation speed of the rotation roller 140 coupled to the hair printer 100, may check a movement speed or a movement distance from a printing start point from this, and may adjust an image output state in synchronization with the movement speed or the movement distance.

As illustrated in FIG. 2, the rotation roller 140 may be disposed at a position adjacent to the printer head 170 of the upper housing 102 and rotate in a direction perpendicular to an extension direction of the upper housing 102, and the sensor module 40 may detect a rotation state of the rotation roller 140.

For example, the rotation roller 140 may disposed on one side of the printer head 170 provided on a lower surface of the upper housing 102 and may be formed to have a length corresponding to the printer head 170. In addition, the rotation roller 140 may be formed of a rubber material to have rotational friction when rolling over the hair and is not limited thereto.

For example, while a user grips hairs in a direction crossing a length direction of the hairs between the upper housing 102 and the lower housing 103, when the housing 101 of the hair printer 100 is slid from an upper side to a lower side of the hairs, the rotation roller 140 may rotate in a direction opposite to a movement direction of the housing 101.

At this time, the program executed by the processor 30 calculates a length of a bundle of hairs based on a value measured by the sensor module 40 as the portable hair printer 100 moves along the hairs while the hairs are gripped between the upper housing 102 and the lower housing 103 of the portable hair printer 100, and a value of the length of the bundle of hairs may be output through the display unit 150 coupled to the portable hair printer 100 or may be transmitted to the user terminal 200.

The sensor module 40 or an encoder may be used and may count the number of rotations of the rotation roller 140.

For example, the user terminal 200 may output a virtual screen whose image is converted in size to correspond to the length of bundle of hairs based on the calculated length of the bundle of hairs, and a user may select an image to be dyed while viewing the virtual screen. At this time, the image, which is selected by the user, is converted in size by the user terminal 200 to correspond to the length of the bundle of hairs and may be transmitted to the portable hair printer 100. Due to this, the portable hair printer 100 may obtain an optimal resolution of the dye image regardless of the length of the bundle of hairs of different users.

The hair measurement sensor 130 may measure a size of a bundle of hairs gripped between the upper housing 102 and the lower housing 103. For example, the hair measurement sensor 130 may be configured as a thickness measurement sensor that measures a thickness of the hair while the hair is gripped between the upper housing 102 and the lower housing 103, and for example, the thickness measurement sensor may be a distance sensor for measuring a distance between the upper housing 102 and the lower housing 103 or may be a pressure sensor for measuring a pressure applied to the upper housing 102 or the lower housing 103 by the hair. For example, the distance sensor may be composed of an infrared sensor or an ultrasonic sensor and is not limited thereto.

At this time, when a size of a bundle of hairs measured by the hair measurement sensor 130 is greater than or equal to a threshold, the program executed by the processor 30 may output an alarm to cause the hairs to be gripped again. Due to this, the upper housing 102 and the lower housing 103 may obtain an appropriate thickness of the hairs such that a high-quality image is printed.

Referring to FIGS. 2 and 3 again, the hair guide 110 may be disposed on a side surface of the lower housing 103 in an extension direction of the lower housing 103 in a region corresponding to the printer head 170 of the upper housing 102 to guide introduction of the hairs.

For example, the hair guide 110 may be formed to extend in a curved shape toward an upper side from the side surface of the lower housing 103. In addition, the hair guide 110 may be formed of a steel material and is not limited thereto.

The comb member 115 may disposed on the side surface of the upper housing 102 in an extension direction of the upper housing 102 in a region corresponding to the printer head 170 of the upper housing 102 to guide hairs to be evenly introduced. For example, the comb member 115 allows hairs to evenly spread through teeth of a comb, thus, preventing the hairs from getting tangled.

That is, the hair guide 110 and the comb member serve to fix hairs such that a certain size of a bundle of hairs is gripped between the upper housing 102 and the lower housing 103.

Referring to FIG. 4, the hair printer 100 according to the present disclosure further includes an ink tank 300 for supplying dyeing ink to the printer module 10, and a tube 310 for transmitting ink of the ink tank 300 to the printer module 10. In addition, in the hair printer 100, the ink tank 300 for supplying dyeing ink to the printer module 10 may be included in the upper housing 102.

As an example, as illustrated in FIG. 4, the ink tank 300 may be configured separately from the hair printer 100 to supply dyeing ink to the printer module 10 through the tube 310 and is not limited thereto. As another example, the ink tank 300 may be configured to be embedded in the upper housing 102, and may be integrally formed with the upper housing 102 to supply dyeing ink to the printer head 170 through the tube 310 or may be formed to be separable from the upper housing 102 to supply dyeing ink to the printer head 170 by coming into contact therewith.

For example, the ink tank 300 may supply dyeing ink to the printer module 10 through an electric pump. The tube 310 serves as a path for transmitting dyeing ink, and the tube 310 that connects the ink tank 300 to the printer module 10 may be provided together with a power supply cable.

Referring to FIG. 5, the hair printer 100 according to the present disclosure further includes, a coating portion 190 for spraying a coating agent before and after the dyeing ink is ejected and a drying portion 180 for drying dyeing ink or the coating agent, which are disposed adjacent to the printer head 170 of the upper housing 102.

As an example, the drying portion 180 may quickly dry the dyeing ink sprayed onto hairs or the coating agent and may be composed of a heater, hot air, and infrared rays. The coating portion 190 may spray a coating agent that assists the dyeing ink sprayed onto hairs to be settled well on each hair or may spray a nutritional agent containing ingredients for health care of a hair.

Meanwhile, the hair printer 100 may further include a cleaning unit 120 that slidably moves to a capping position for capping the printer head 170 and an uncapping position for dyeing.

For example, the cleaning unit 120 may include a wiping portion that wipes the ink on the printer head 170 while slidably moving in a state in contact with the printer head 170. In other words, the cleaning unit 120 not only serves as a cover to prevent the printer head 170 from being exposed to the outside when not in use, but also removes ink remaining in the printer head 170 through the wiping portion during sliding movement. For example, the number of wiping portions may correspond to the number of printer heads 170 and is not limited thereto.

In detail, when the hair printer 100 is used, the cleaning unit 120 may be slidably moved from the capping position to the uncapping position. At this time, when not in use, the wiping portion may wipe off the ink leaked from the printer head 170. In addition, when use of the hair printer 100 is completed, the cleaning unit 120 may be slidably moved from the uncapping position to the capping position. The wiping portion may wipe off the ink remaining in the printer head 170. For example, the wiping portion may be formed of a porous absorbent material such as a fiber or sponge capable of absorbing ink and is not limited thereto.

The cleaning unit 120 may include a capping portion that comes into close contact with the printer head 170 when the printer head 170 is capped. The capping portion is in close contact with a circumference of the printer head 170, and a central portion thereof is recessed to collect that ink dripping from the printer head 170, and thus, contamination due to ink may be prevented.

In addition, the wiping portion and the capping portion may be replaced as needed when used for a certain period of time. For example, a replacement cycle may be notified by an alarm through an application or by an alarm an apparatus itself.

The cleaning unit 120 may further include an opening/closing sensor for detecting whether the cleaning unit 120 is opened or closed. In addition, a user may check whether the cleaning unit 120 is opened or closed through the display unit 150. For example, when a predetermined time elapses in an uncapping state in which the printer head 170 is opened, the cleaning unit may raise an alarm to a user through the opening/closing sensor to prevent the printing head 170 from being dried.

Hereinafter, a hair printing method using the portable hair printer 100 according to the present disclosure will be described. Hereinafter, description on a configuration of performing the same function among the configurations illustrated in FIGS. 1 to 5 described above will be omitted.

Figure 6:
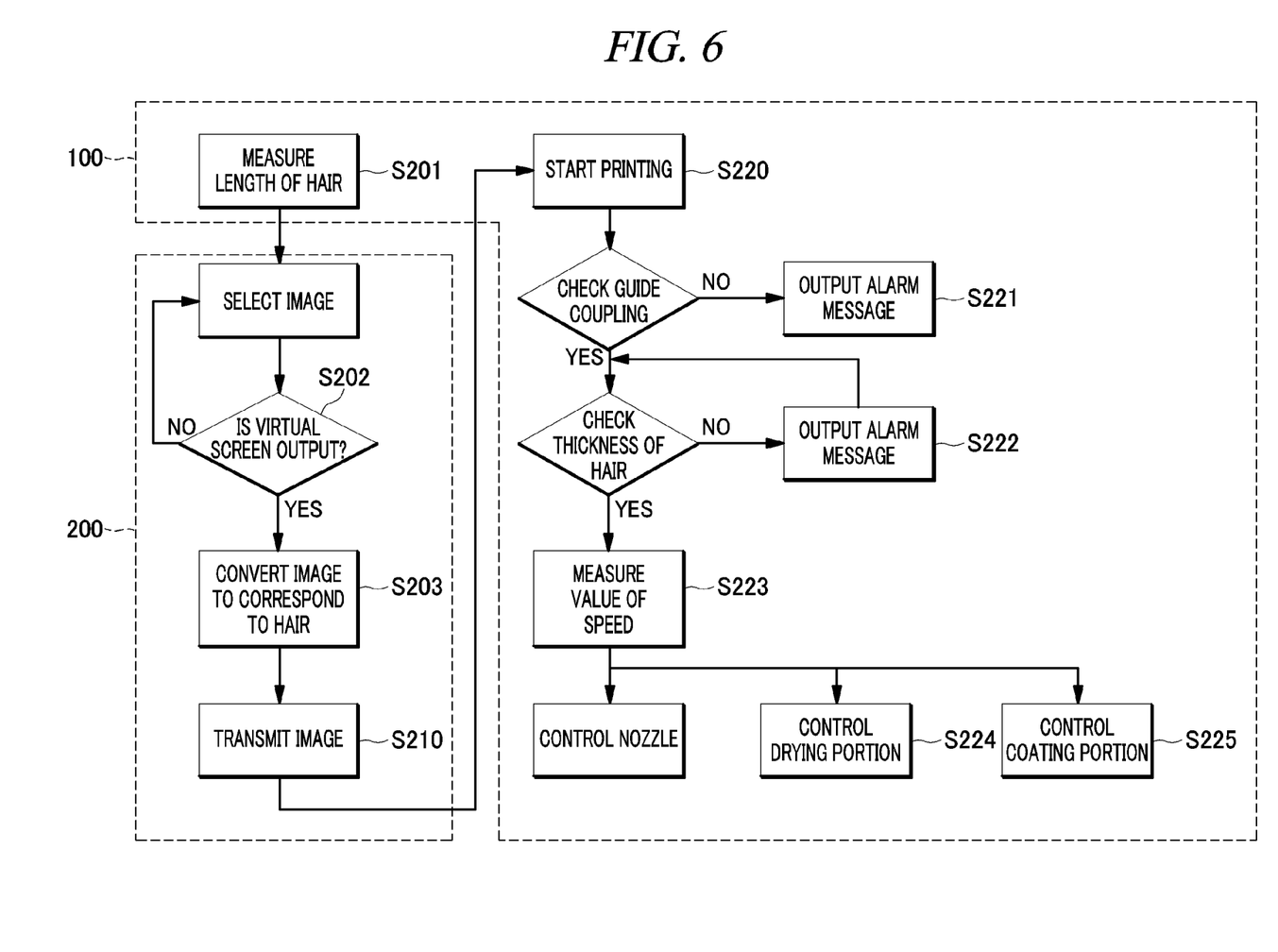
FIG. 6 is a flowchart illustrating a hair printing method using the portable hair printer, according to another embodiment of the present disclosure.

FIG. 6 is a flowchart illustrating a hair printing method using a portable hair printer, according to an embodiment of the present disclosure.

Referring to FIG. 6, the hair printing method using the portable hair printer 100 includes step S210 of receiving an image to be dyed on hairs from the user terminal 200 through the communication module 20 by the portable hair printer 100 and step S220 of performing an image printing operation for the hairs by transmitting the received image to the printer module 10 included in the portable hair printer 100.

Specifically, the method may further include step S201 of calculating a length of a bundle of hairs based on a value measured through the sensor module 40 for detecting a movement state of the portable hair printer 100 as the portable hair printer 100 moves along the hairs while the hairs are gripped by using the upper housing 102 and the lower housing 103 of the portable hair printer 100 before step S210 of receiving an image is performed.

In addition, the method may further include step S202 of imaging or receiving a hair image of a person to be dyed by the user terminal 200, synthesizing a hair image and an image to be dyed which size is converted and provide it to the user terminal S200 before step S210 of receiving the image is performed.

For example, when a user selects an image to be dyed through the user terminal 200 after step S201, a virtual screen having an image converted in size to correspond to a length of a bundle of hairs of a user may be output and an image may be selected again by the user or image determination may be completed (S202). The user-determined image (that is, the image received in step S210) may be converted in size by the user terminal 200 to correspond to a length of a bundle of hairs, based on the length of the bundle of hairs calculated in step S201 (S203).

In step S220 of performing a printing operation, when a size of a bundle of hairs measured by the hair measurement sensor 130 that measures the size of a bundle of hairs gripped is greater than or equal to a threshold while the hairs are gripped between the upper housing 102 and the lower housing 103 of the portable hair printer 100, an alarm may be output to cause the hairs to be gripped again (S222).

For example, before step S222 is performed, whether the comb member 115 and the hair guide 110 are coupled to each other is checked while hairs are gripped between the comb member 115 disposed on a side surface of the upper housing 102 and the hair guide 110 disposed on a side surface of the lower housing 103, and when the hairs are not coupled such that the hairs are evenly introduced, an alarm may be output to cause the hairs to be gripped again (S221).

Then, the portable hair printer 100 may collect information on a movement state of the hair printer 100 on hairs, based on a value measured by the sensor module 40 that detects the movement state of the portable hair printer 100 as the portable hair printer 100 moves along the hairs, and adjust an output state of an image in synchronization with the collected information (S223).

Specifically, in step S223, the sensor module 40 may check a movement speed or a movement distance from a starting point by detecting a rotation speed of the rotation roller 140 coupled to the hair printer 100, and adjust the output state of the image in synchronization with the movement speed or the movement distance.

Step S220 may include step S224 of spraying a coating agent before and after dyeing ink is ejected through the coating portion 190 disposed adjacent to the printer module 10 and step S225 of drying the dyeing ink or the coating agent through the drying portion 180 disposed adjacent to the coating portion 190.

Meanwhile, the embodiment of the present disclosure may also be implemented in the form of a recording medium including instructions that is executable by a computer, such as a program module executed by a computer. Computer readable media may be any available media that may be accessed by a computer and include all of volatile and nonvolatile media, and removable and non-removable media. In addition, the computer readable media may include computer storage media. The computer storage media includes all of volatile and nonvolatile media, and removable and non-removable media which are implemented by any method or technology for storing information such as computer readable instructions, data structures, program modules or other data.

The above description of the present disclosure is for illustration only, and those skilled in the art to which the present disclosure belongs will understand that modifications to other specific forms may be easily made without changing the technical ideal or essential features of the present disclosure. Therefore, it should be understood that the embodiments described above are illustrative in all respects and not restrictive. For example, each configuration element described as a single type may be implemented in a distributed manner, and similarly, configuration elements described as distributed may be implemented in a combined form.

It should be construed that the scope of the present disclosure is indicated by the following claims rather than the above detailed description, and all the changed or modified forms derived from the meaning and scope of the claims and their equivalent concepts are included in the scope of the present disclosure.

What is claimed is:

1. A portable hair printer comprising:
    a communication module;
    a printer module that performs a printing operation;
    a memory that stores a program for printing an image on a surface of a bundle of hairs; and
    a processor that executes the program,
    wherein the program is executed by the processor, receives an image to be dyed on the bundle of hairs from the user terminal through the communication module, and transmits the received image to the printer module to perform an image printing operation for the bundle of hairs,
    wherein the portable hair printer further comprises a housing having the communication module, the printer module, the memory, and the processor embedded therein,
    wherein the housing includes an upper housing and a lower housing hinged to each other around a hinge, and a sensor module,
    wherein a printer head of the printer module is exposed at one end of the upper housing,
    wherein the sensor module is disposed at a position adjacent to the printer head of the upper housing and measures information on a movement speed of the portable hair printer on the bundle of hairs or a movement distance from a printing start point of the image, and
    wherein the bundle of hairs is gripped between the upper housing and the lower housing as the upper housing and the lower housing approach each other.

2. The portable hair printer of claim 1, further comprising:
    the sensor module for detecting a movement state of the portable hair printer on the bundle of hairs, wherein the program adjusts an output state of the image in synchronization with information on the movement state of the portable hair printer on the bundle of hairs.

3. The portable hair printer of claim 1, further comprising:
a hair guide that is disposed on a side surface of the lower housing in an extension direction of the lower housing in a region corresponding to the printer head of the upper housing, and guides introduction of the bundle of hairs.

4. The portable hair printer of claim 1, further comprising:
a comb member that is disposed on a side surface of the upper housing in an extension direction of the upper housing in a region corresponding to the printer head of the upper housing, and guides the bundle of hairs to be evenly introduced.

5. The portable hair printer of claim 1, further comprising:
a hair measurement sensor for measuring a size of the gripped bundle of hairs while the bundle of hairs is gripped between the upper housing and the lower housing,
wherein the hair measurement sensor is a thickness measurement sensor for measuring a thickness of the bundle of hairs while the bundle of hairs is gripped between the upper housing and the lower housing, and
wherein the program raises an alarm when the size of the bundle of hairs measured by the hair measurement sensor is greater than or equal to a threshold, such that the bundle of hairs is gripped again.

6. The portable hair printer of claim 1, further comprising:
a coating portion that is disposed adjacent to the printer head of the upper housing and sprays a coating agent before and after dyeing ink is ejected; and
a drying portion that dries the dyeing ink or the coating agent.

7. The portable hair printer of claim 1, further comprising:
an ink tank that supplies dyeing ink to the printer module; and
a tube that transmits ink of the ink tank to the printer module.

8. The portable hair printer of claim 1,
wherein an ink tank that supplies dyeing ink to the printer module is included in the upper housing.

9. The portable hair printer of claim 1, further comprising:
a display unit that displays an operation state of the portable hair printer.

10. The portable hair printer of claim 1,
wherein the program calculates a length of the bundle of hairs based on a value measured by the sensor module as the portable hair printer moves along the bundle of hairs while the bundle of hairs is gripped between the upper housing and the lower housing of the portable hair printer, and outputs a value of the length of the bundle of hairs on a display unit coupled to the portable hair printer or transmits the value of the length of the bundle of hairs to the user terminal.

11. A hair printing method using a portable hair printer, the method comprising:
receiving an image to be dyed on a bundle of hairs from a user terminal through a communication module by using the portable hair printer; and
transmitting the received image to a printer module included in the portable hair printer to perform an image printing operation for the bundle of hairs,
wherein, the method further comprises calculating a length of the bundle of hairs based on a value measured by a sensor module for detecting a movement state of the portable hair printer as the portable hair printer moves along the bundle of hairs while the bundle of hairs is gripped between the upper housing and the lower housing of the portable hair printer, before the receiving of the image is performed, and
wherein the received image's size is converted by the user terminal to correspond to the length of the bundle of hairs, based on the length of the bundle of hairs.

12. The hair printing method of claim 11, further comprising:
imaging or receiving a hair image of a person to be dyed by the user terminal, synthesizing the hair image and the image to be dyed which size is converted and provide it to the user terminal, before the receiving of the image is performed.

13. The hair printing method of claim 11,
wherein, in performing the image printing operation, information on a movement state of the hair printer on the bundle of hairs is collected based on a value measured by a sensor module for detecting the movement state of the portable hair printer as the portable hair printer moves along the bundle of hairs, and an output state of the image is adjusted in synchronization with the collected information.

14. The hair printing method of claim 11,
wherein, in performing the image printing operation, when a size of the bundle of hairs measured by a hair measurement sensor which measures a size of the bundle of hairs gripped between the upper housing and the lower housing of the portable hair printer is greater than or equal to a threshold, an alarm is raised to grip the bundle of hairs again.

15. The hair printing method of claim 11,
wherein the performing of the image printing operation includes spraying a coating agent before and after dyeing ink is ejected through a coating portion disposed adjacent to the printer module, and drying the dyeing ink or the coating agent through a drying portion disposed adjacent to the coating portion.

* * * * *